May 28, 1940.   R. G. MOBARRY ET AL   2,202,061
PROJECTING APPARATUS
Filed April 13, 1938
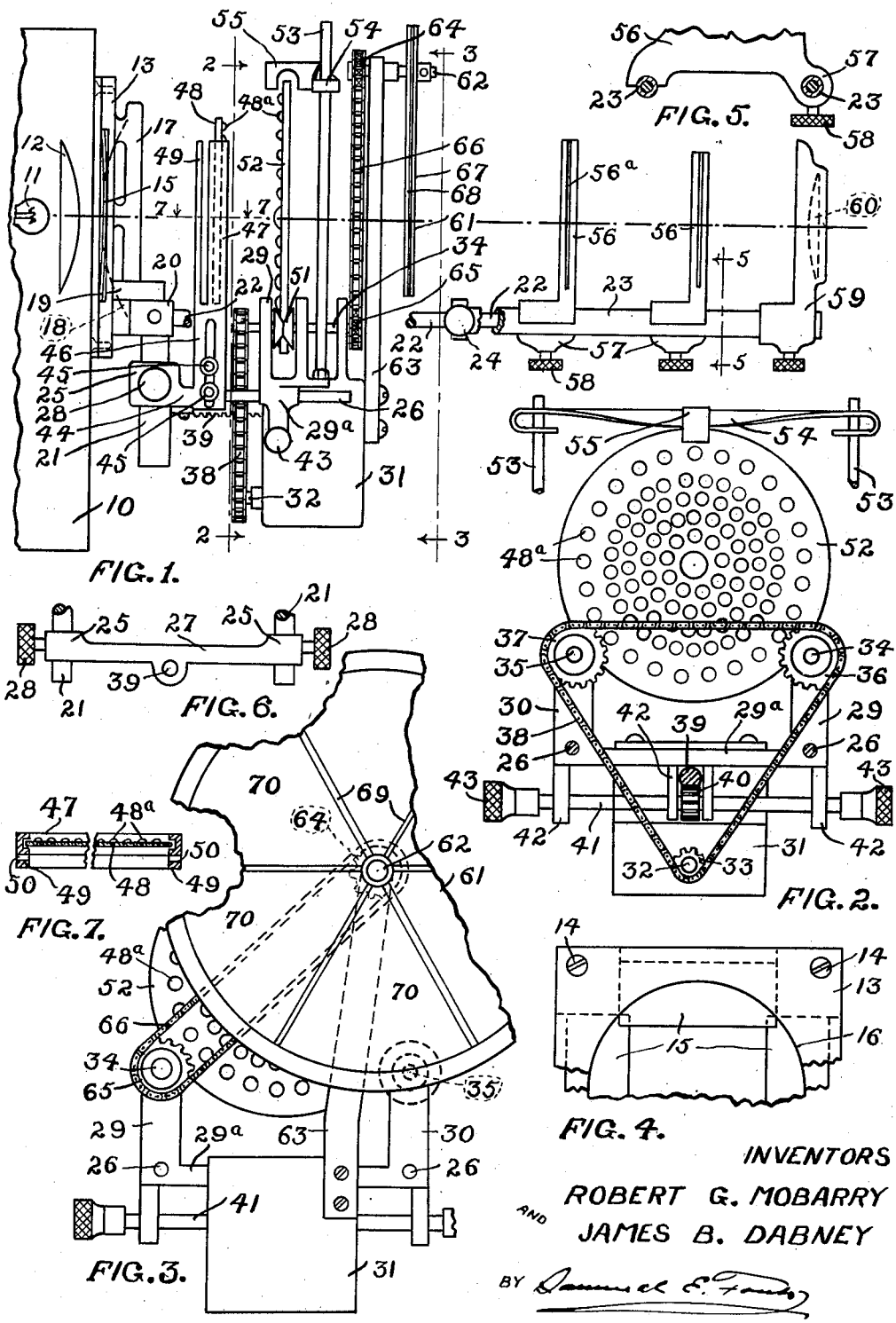
INVENTORS
ROBERT G. MOBARRY
AND JAMES B. DABNEY
BY
ATTORNEY Patented May 28, 1940

2,202,061

UNITED STATES PATENT OFFICE 2,202,061

PROJECTING APPARATUS

Robert G. Mobarry, Bellflower, and James B. Dabney, Los Angeles, Calif.

Application April 13, 1938, Serial No. 201,716

11 Claims. (Cl. 88—24)

Our invention relates to apparatus for projecting pictures or images upon a screen and, at the same time, producing various effects, such as color or movement, or both color and movement on or associated with the projected images, whereby to attract the interest of observers and to add to the beauty of the picture or image projected. If pictures be projected, they may be moving or still, as ordinary lantern slides.

The object of the invention, therefore, is the production of an apparatus having means for projecting light upon a screen with suitable adjustments for focusing the light to the best advantage, and for producing various effects on the screen whereby the attractiveness of the exhibit is enhanced and the interest of observers is increased. The natures of these effects will be set forth more fully hereinafter, as will also the details of the apparatus which we prefer to employ. It is to be understood, however, that these details may be varied without departure from the principles of our invention and that the claims appended hereto are not intended to be restricted to such details any farther than their express terms and the prior art require.

In the accompanying drawing, Fig. 1 is a side elevation of the apparatus, parts being broken away for clearness of illustration; Figs. 2 and 3 are transverse sections taken on planes represented by lines 2—2 and 3—3 respectively, of Fig. 1; Fig. 4 is a fragmentary view in elevation of a detail appearing at the left of Fig. 1; Fig. 5 is a sectional view on line 5—5 of Fig. 1; Fig. 6 is a fragmentary side elevation of one of the adjusting features, and Fig. 7 is a section on line 7—7 of Fig. 1.

At the left in Fig. 1 is shown a portion of a box or casing 10 for containing some suitable source of light 11. This box forms no part of our invention proper, although it serves as a support for it, the apparatus which we claim as our invention being releasably attached in any suitable manner to the side of the box opposite the light source. Preferably, a lens 12 is within the box to collect the rays of light and project them into a condensing lens of the apparatus.

Taking up a description of the invention proper, 13 is a rectangular member, the upper half of which is shown in front elevation in Fig. 4. It is this member which is attached to the box or casing 10. It is made up of two plates which are secured together face to face, as by screws 14. The rear plate is channeled both vertically and horizontally to provide slots for the reception of four slidable shutter members 15; three of which appear in Fig. 4. By sliding these members laterally, the circular aperture 16 through the plates is opened or closed, thus to adjust the aperture to the size of the screen, which is not shown. The rear plate of the member 13 supports an element 17, within which a lens 18 is mounted. Projecting rearwardly from the said rear plate is a pair of spaced lugs 19, each of which lugs is provided with a downwardly extending cylindrical socket 20 to receive the upper end of a post 21. The drawing shows but one of these socket members and posts, but it is to be understood that there are two of each and that they are symmetrically positioned with respect to the aperture 16 and at opposite sides thereof. To each of the socket members 20 there is removably attached the forward end of a guide rod 22, upon which is telescopically mounted a sleeve 23, the latter having a set-screw 24 for holding it in any position to which it may be adjusted by sliding it upon the rod 22. The posts 21 are each projected through and are slidable within a collar 25 to which is rigidly secured the forward end of a guide rod 26. As will be seen in Fig. 6, the opposed collars 25 are joined by a bridge element 27 and they are each attached to its respective post 21 by a set-screw 28. The collars 25 and all the parts carried by or supported from them may be adjusted up and down on the posts 21 and be secured in any position by the set screws 28.

Mounted to slide upon the rods 26 is a frame 29ª having upwardly extending arms 29 and 30. Below the frame and rigidly attached thereto is the casing 31 of a motor, said motor having a forwardly projecting shaft 32 to which a small sprocket wheel 33 is secured. Journaled in the upper ends of the arms 29 and 30 are short shafts 34 and 35 respectively, to which are secured sprocket wheels 36 and 37 in the plane of the sprocket wheel 33. A sprocket chain 38 extends about these wheels, whereby the shafts 34 and 35 are driven together and in the same direction from the motor shaft.

Projecting rearwardly from the bridge element 27 (see Fig. 6) is a rack 39 which extends into the motor casing 31 where it meshes with a pinion 40 on a shaft 41 which is journaled in ears 42 that depend from the frame 29ª. The shaft extends beyond these ears and is provided at its ends with knurled knobs 43. When these knobs are turned, the rack causes the frame 29ª and the parts carried by it to move toward or from the lens 18.

Each of the collars 25 has a rearwardly projecting arm 44 with an upwardly turned rear end which is adjustably secured, as by screws 45, to downwardly extending arms 46 of a frame 47. As will be clear from Fig. 7, this frame has upwardly extending channeled side arms which are adapted to receive a plate 48 of glass or other suitable transparent or translucent material, said plate being inserted from above into the opposing channels of the side arms of the frame. As indicated, the rear face of the plate 48 is provided with some suitable design, preferably made up of small dome-shaped knobs 48ᵃ which are integral with the plate, each of said knobs constituting a lens which refracts the light passing through them. Or, instead of projecting knobs, the surface of the plate may be provided with depressions arranged according to any suitable design, the inclined walls of the depressions serving to refract the light. Spaced slightly from the channeled side arms of the frame 47 are vertically extending members 49, the spaces 50 between said members and the channeled side arms forming a guide way for lantern slides in case the operator wishes to project still life pictures.

It will be noted that, as the pinion 40 is rotated, the motor casing, the frame 29ᵃ and all the parts mounted on or supported by them are racked back and forth toward or from the lens 18.

Secured to each of the shafts 34 and 35 is a spool 51, the same having a V-shaped peripheral groove, within which rests the circular edge of a disk 52 of glass or other suitable transparent or translucent material. This disk has one of its faces provided with suitably shaped and arranged refracting projections or depressions, similar to those on or in plate 48. Preferably these refracting elements are on that side which faces the latter plate, so that the refracting elements are on the adjacent faces of said plate and disk, as indicated.

Rising from some suitable and stationary part of the apparatus, as from the frame 29ᵃ, is a pair of opposed standards 53 upon which a spanning member 54 is adapted to slide. This member has a U-shaped bend at each of its ends and the standards pass through perforations in both legs of the bend, as shown in Fig. 2. By this arrangement, the standards are gripped and the member 54 is held in any position of adjustment. Midway between the standards, the member is provided with an element 55 on its forward side, the same having a guide notch in the plane of the disk 52. When the disk is positioned on the spools 51 and the member 54 is lowered, the said notch receives the upper edge of the disk and holds the latter in vertical position.

From the foregoing description it will be understood that when the source of light is energized and the motor shaft 32 is driven, the light will be projected through the lenses 12 and 18, through the plate 48 with its refracting elements and through the disk 52 with its refracting elements, and that the disk will be rotated. The effect of the said refracting elements is to break up the field of light into more or less separated and intensified beams which fall upon the screen in spots of light. By reason of the rotation of the disk 52, these spots are moved orbitally on the screen and thus produce an effect which is both interesting and attractive.

It is sometimes desirable to change the color of the light falling on the screen. For that purpose we mount on the rods 22 or, more properly, on the sleeve 23, a plurality of frame members 56 best shown in Figs. 1 and 5. The members are all alike except as to size. As the field of light is contracting beyond the condensing lens 18, the members diminish in size from left to right. Each member is journaled at one end, 57, on the sleeve 23 and is rested on but not secured to the opposite sleeve. By this arrangement, any of the members may be removed from the field of light by simply turning it on its journal. The members may be held in any position of adjustment by set screws 58. Each of the frame members 56 is provided with a sheet 56ᵃ of colored material forming a filter, and the filters are of different colors. At their rear ends, the sleeves 23 carry a frame 59 for the objective lens 60.

Striking effects may be obtained by making frequent and sequential changes of color of the light falling on the screen. Means for accomplishing this result is illustrated in Figs. 1 and 3, and the same comprises a rotatable color disk 61 which is secured to a shaft 62. This shaft is journaled in the upper end of an arm 63 which is attached to some suitable stationary part, as to the motor casing 31. The shaft 62 has a sprocket wheel 64 attached to it. A similar wheel 65 is attached to the spool shaft 34, and a sprocket chain 66 is passed around these wheels whereby, as the refracting disk 52 is turned in one direction, the color disk 61 is turned in the opposite direction and at a higher speed. The color disk is located back of and overlaps the disk 52 so that the light passing through the aperture in the member 13 passes through both of said disks. The color disk is made up of a pair of wheel-like members 67 and 68 with radiating spokes 69, between which sector-shaped pieces 70 of suitable transparent or translucent material are secured. The said pieces are of different colors and their number will be as large as practicable, limited only by the cross-sectional area of the field of light through which they cut.

From the above it will be understood that the light passing through the aperture bounded by the shutter members 15 is projected through the condensing lens 18 and proceeds therefrom in a gradually tapering body to the objective lens 60. From the lens 18 it first passes through the refracting plate 48 which breaks it up so that it falls upon the refracting disk 52 in more or less well defined spots. The disk, with its refracting elements 48ᵃ, which are revolving about the disk axis, causes the light to fall upon the screen in spots which seem to float and to scintillate, thus producing a very attractive and interesting effect. Further as the light may be passed through one or more of the colored filters 56ᵃ, the light falling upon the screen may be of any color desired. Finally, the light may be passed through the color disk 61 and thus be caused to change its color almost from instant to instant.

The various features of adjustment hereinbefore described may again be referred to. It is to be understood that the box or casing 10 containing the source of light 11 is stationary and that the member 13 is attached to it. Consequently, said member is stationary during the operation of the apparatus, as are also the lens holder 17 and the posts 21. If the light should fall too high or too low or too far to one side of the screen, it may be properly directed by moving the shutter members 15. The guide rods 22 are also stationary, although the sleeve 23 may be slid forwardly or backwardly upon the rods to assist in focusing the light on the screen. Focusing is further effected by turning the knobs 43 to move the disk 52 and the color disk 61 toward or from the lens 18. These parts and the refracting plate 48 may also be adjusted vertically by sliding the collar members 25 up and down the posts 21. The refracting plate 48 may be adjusted independently by loosening the screws 45 and by moving the frame 47 up or down. The slots shown in Fig. 1 allowing such movement.

Having described our invention, we claim:

1. A projecting apparatus comprising a casing containing a source of light, an apertured member adapted to form a light-tight connection with said casing, a condensing lens supported at the rear of said member, a pair of telescopic rods supported by said member, an objective lens supported on said telescopic rods, a pair of guide posts, rigidly connected with the apertured member, a refracting disk between the condensing and the objective lenses, means for rotating said disk, and connections between the latter means and the said posts, said connections being adjustably mounted on said posts, whereby the refracting disk may be moved with respect to the light projected through the said lenses.

2. A projecting apparatus as set forth in claim 1 having a non-rotatable refracting member between the rotatable disk and the condensing lens, and means attached to the connections between the rotating disk and the posts for supporting the said non-rotatable refracting member.

3. A projecting apparatus as set forth in claim 1 having a non-rotatable refracting member between the rotatable disk and the condensing lens, and means adjustably attached to the connections between the rotating disk and the posts providing an adjustable support for the non-rotatable refractory member, said disk and non-rotatable members being plates of transparent or translucent material with refracting elements on their adjacent sides.

4. A projecting apparatus comprising a casing containing a source of light, an apertured member adapted to be secured to said casing, a condensing lens supported at the rear of said member, a pair of guide posts rigidly connected with the apertured member, a guide rod for and extending rearwardly from each of said posts and adjustably connected therewith, a frame slidably mounted on said guide rods, a motor casing attached to said frame, a motor shaft projecting from said casing, a sprocket wheel attached to said shaft, a pair of shafts journaled in said frame and parallel with the motor shaft, a sprocket wheel for and attached to each of said shafts of the pair, said sprocket wheels on the motor shaft and the pair of shafts being in the same plane and the shafts of the pair being at opposite sides of the apparatus, a sprocket chain passing about the said sprocket wheels, a refracting plate at the rear of the condensing lens, said plate being supported from said posts, a refracting disk at the rear of said refracting plate, said disk and plate being provided with refracting elements on their adjacent faces, a spool for and secured to each of the pair of shafts, each of said spools having a V-shaped peripheral groove within which grooves the circular rim of the refracting disk rests, means supported from said frame for holding said disk in upright position on said spools, and means for moving the motor casing, the frame, the spools and the disk toward and from the refracting plate, for the purpose specified.

5. An apparatus as set forth in claim 4 in which the means for holding the refracting disk in upright position comprises a pair of opposed standards supported at opposite ends of the frame, a spanning member extending between said standards, and means on the spanning member for engaging the disk.

6. An apparatus as set forth in claim 4 in which the means for holding the refractory disk in upright position comprises a pair of opposed standards supported at opposite ends of the frame, a spanning member extending between said standards, said spanning member being of resilient material and having both its ends bent into a U-shaped formation and both legs of the U being perforated to receive the respective standard, and means at the center of the spanning member having a notch for receiving the edge of the refracting disk.

7. A projecting apparatus comprising a casing containing a source of light, an apertured member adapted to be secured to said casing, a condensing lens supported at the rear of said member, means associated with said member to vary the size of the aperture therein, a pair of guide posts rigidly connected with the apertured member, a collar for and slidably mounted on each of said posts, a bridge member connecting said collars, means for securing said collars to the respective posts in any position of adjustment thereon, a rack extending rearwardly from said bridge member, a guide rod for and rigidly attached to each of said collars, a frame slidably mounted on said guide rods, a motor casing carried by said frame and having a rotatable motor shaft projecting therefrom, a sprocket wheel secured to the motor shaft, a transverse shaft journaled in said frame, a pinion secured to said transverse shaft and meshed with said rack whereby, when the pinion is turned, the frame is moved with respect to the rack, a spool shaft for and journaled in said frame at each end thereof, a sprocket wheel for and secured to each of said spool shafts, the latter sprocket wheels being in the plane of the sprocket wheel on the motor shaft, a sprocket chain extending about all of said sprocket wheels for causing them to turn together, a spool for and secured to each of said spool shafts, each of said spools being provided with a V-shaped peripheral groove, a refracting disk resting with its circular rim in said grooves so that, when the motor shaft is turned, the disk will be rotated, said disk being provided with refracting elements on one of its sides, means for holding the said disk in vertical position on said spools, an objective lens in axial alinement with the condensing lens, and means for supporting said objective lens, the said refracting disk being positioned between said lenses.

8. A projecting apparatus as set forth in claim 7 having a non-rotatable refracting plate between the rotatable refracting disk and the condensing lens, said plate having refracting elements thereon, for the purpose specified.

9. A projecting apparatus as set forth in claim 7 having a non-rotatable refracting plate between the rotatable refracting disk and the condensing lens, said plate having refracting elements thereon, and means for supporting said plate from the said collars so that the plate is adjusted in position as the collars are moved on their guide posts.

10. A projecting apparatus as set forth in claim 7 having a non-rotatable refractory plate between the rotatable disk and the condensing lens, said plate having refracting elements thereon, means for supporting said plate from the said collars so that the plate is adjusted in position as the collars are moved on their guide posts, and means for adjusting said plate with respect to said collars.

11. A projecting apparatus as set forth in claim 7 in which the objective lens is adjustably mounted on a pair of rods and said rods are rigidly connected with said apertured plate.

ROBERT G. MOBARRY.
JAMES B. DABNEY.